June 11, 1957         A. L. BRALOVE ET AL         2,795,226
CARD SELECTION APPARATUS
Filed March 27, 1953                              7 Sheets-Sheet 3

INVENTORS.
Allan L. Bralove,
BY Clarence F. Rogier,

June 11, 1957  A. L. BRALOVE ET AL  2,795,226
CARD SELECTION APPARATUS
Filed March 27, 1953  7 Sheets-Sheet 4

INVENTORS
Allan L. Bralove,
BY Clarence F. Rogier, June 11, 1957   A. L. BRALOVE ET AL   2,795,226
CARD SELECTION APPARATUS
Filed March 27, 1953   7 Sheets-Sheet 5

INVENTOR.
Allan L. Bralove,
BY Clarence F. Rogier,

INVENTORS.
Allan L. Bralove,
BY Clarence F Rogier,

June 11, 1957 A. L. BRALOVE ET AL 2,795,226
CARD SELECTION APPARATUS
Filed March 27, 1953 7 Sheets-Sheet 7

INVENTORS.
Allan L. Bralove,
BY Clarence F. Rogier,

United States Patent Office

2,795,226
Patented June 11, 1957

2,795,226

CARD SELECTION APPARATUS

Allan L. Bralove, Washington, D. C., and Clarence F. Rogier, Chicago, Ill., assignors to The Electrofile Corporation, Chicago, Ill., a corporation of Illinois Application March 27, 1953, Serial No. 345,170

7 Claims. (Cl. 129—16.1)

This invention relates to a new and improved card selection apparatus and more particularly to an electrically operated, key controlled apparatus for this purpose.

Apparatus of this character has many uses as, for example, in banking and credit operations where it is desired to quickly select a depositor's or client's card either for inspecting or to make entries. Manual selection of cards from among hundreds of similar cards is time consuming and the present invention allows an employee to handle many more transactions in a day expeditiously and efficiently.

The invention comprises selection apparatus independent of the card holding trays so that a single apparatus may be used with any of a plurality of trays of cards which may be manually inserted and removed from the apparatus as desired.

It is an object of the present invention to provide a new and improved apparatus for the selection of a desired card or cards from a card file.

It is also an object to provide such apparatus designed to facilitate the placing in the apparatus and removal from the apparatus of a tray of cards while maintaining card alignment with a minimum of effort.

It is another object to provide an apparatus including selector bars with automatic registration of a tray of cards with the selector bars whereby there is no need to align the cards, or need to handle or touch cards for the purpose of registration and alignment except when the cards are individually removed or replaced.

It is an additional object to provide apparatus having a completely automatic cycle of operation after the manual key operated positioning of the desired selector bars.

It is a further object to have such cycle of operation include energization of a magnet to cause lateral movement of the selected card or cards, the return of the selector bars to their initial position, and the raising of an aligner-lifter bar to lift an end of the selected card or cards.

It is also an object to provide apparatus which in addition to selecting cards serves to code cards by cutting from the cards desired coding teeth by an automatic cycle of operation.

It is another object to provide a construction of this character in which the desired cycle of operation is put in motion by depressing a single bar or key, the circle terminating with all parts in their original position ready for another selection or coding operation.

It is an additional object to provide such apparatus with an interlock which serves to prevent operation of a selection cycle unless at least one selector bar is in selection position.

It is a further object to provide a construction including a code or correction key which causes the parts to return to initial position without energization of the selector magnet, thus clearing the keyboard in the event of error in depressing undesired selector keys, and serving for coding by cutting teeth from cards, in both of which cases it is not desired to move the cards laterally by means of the magnet.

It is also an object to provide apparatus in which the cards are maintained in registration at all times while in the apparatus.

It is also an object to provide apparatus including a suitable guide to register cards to be coded with cutter bars actuated by the selector bars, said apparatus further including a pocket for receiving cut off teeth, the guide and pocket being removable to empty the pocket.

It is another object to provide apparatus of this character in which the magnet is so located relative to the cards as to move laterally the cards not held by selector bars while not either intentionally or inadvertently tilting or otherwise moving cards so held.

It is an additional object to provide apparatus which is simple and rapid in operation with a high accuracy in pulling and elevating desired cards.

Other and further objects will appear as the description proceeds.

Certain preferred embodiments of the invention are shown in the accompanying drawings, in which—

Figure 1:
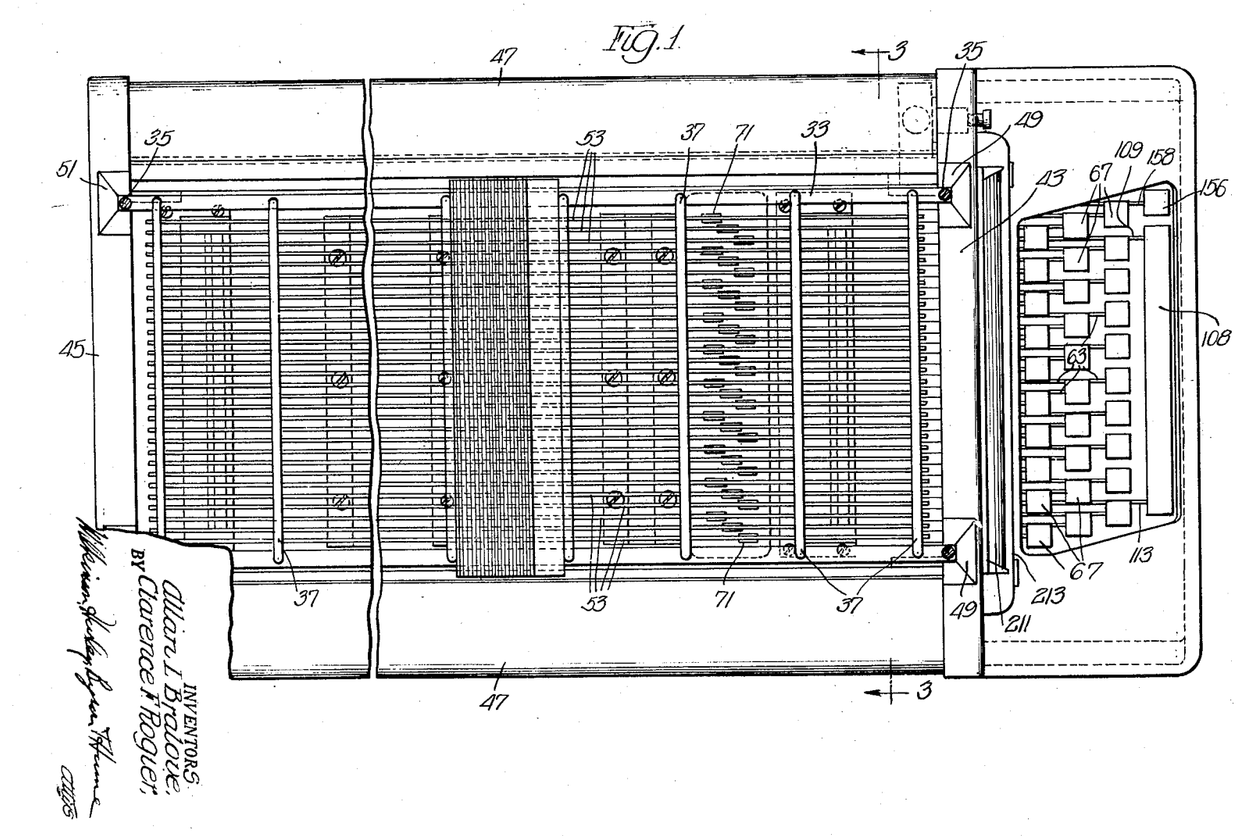
Figure 1 is a plan view of the apparatus.
Figure 2:
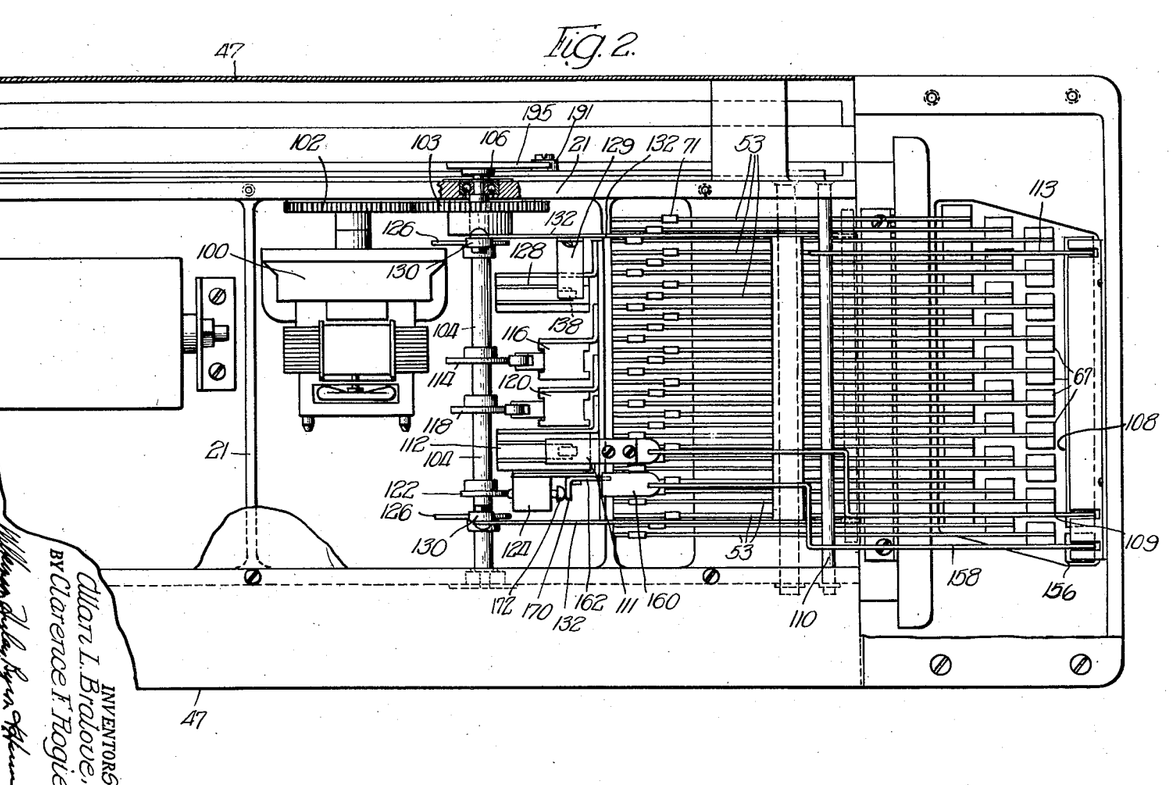
Figure 2 is a view of the apparatus as seen from below.
Figure 3:
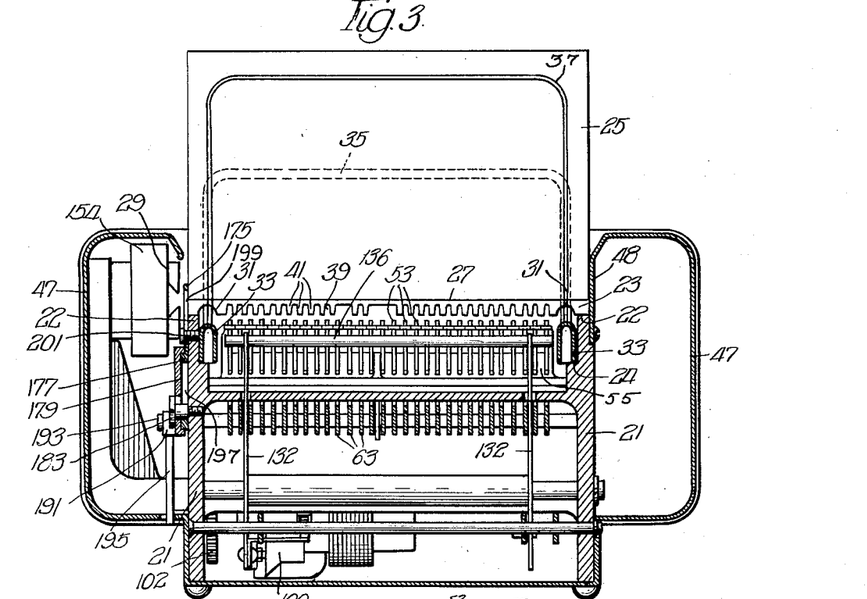
Fig. 3 is a vertical transverse section taken on line 3—3 of Figure 1.
Figures 12, 13:
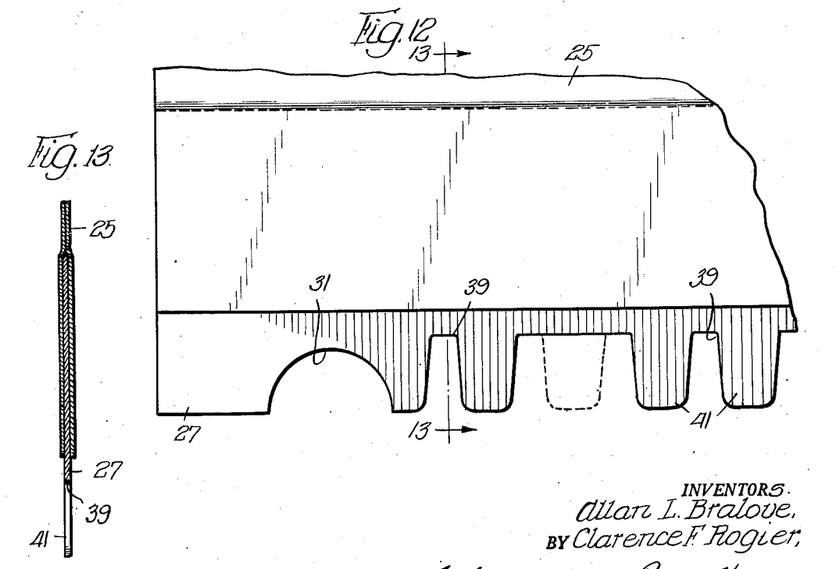
Figure 12 is a fragmentary elevation, on an enlarged scale, of one form of card adapted for use with the apparatus.
Figure 13 is a section taken on line 13—13 of Figure 12.

Referring first to Figures 1, 2 and 3, the apparatus comprises a main frame 21 which is shown as a casting. The top edges 22 of this casting form rails upon which rest the outer edges 23 of the file cards 25. While these cards may be made in various forms, a preferred form is shown in Figures 12 and 13. As shown in those figures, the cards 25 are laminated from two sheets of cardboard and a metallic strip 27 extends across the lower portion of the card between the lamination. This strip is made of magnetically conductive material so as to be attracted by the magnet 29 during the course of the operation of the apparatus, as will appear hereinafter.

The card strip 27 has a pair of arcuate notches 31 formed in its lower edge adjacent its ends, these notches being adapted to rest upon the upper arcuate faces of the side rails 33 of card trays when the tray and its cards are not in the apparatus for use therein. The rails 33 are connected at each end by U-shaped handles 35 and are connected at intermediate points by U-shaped card spacers 37, these three elements together constituting the trays as shown in Figures 1 and 3.

The metallic strip 27 is also provided with a plurality of notches 39, which notches form teeth 41, these notches and teeth being used in the operation of the apparatus as will be described hereinafter in detail. These teeth may be about one-quarter inch in depth and have their sides tapered as shown. The main casting 21 is housed in the front by the tray guide and casting 43 and in the rear by the tray guide 45 which are secured to the casting. These members 43 and 45 are shown in Figure 1. Lateral housing members 47 are also secured to the main casting 21. The front and rear tray guides 43 and 45 are provided with downwardly and inwardly sloping guide portions 49 and 51, respectively, which serve to guide the side rails 33 and consequently the cards 25 and tray into the desired precise location in the apparatus. It will be noted that the guide portions 49 and 51 guide the rail ends both laterally and longitudinally of the apparatus.

Figure 6:
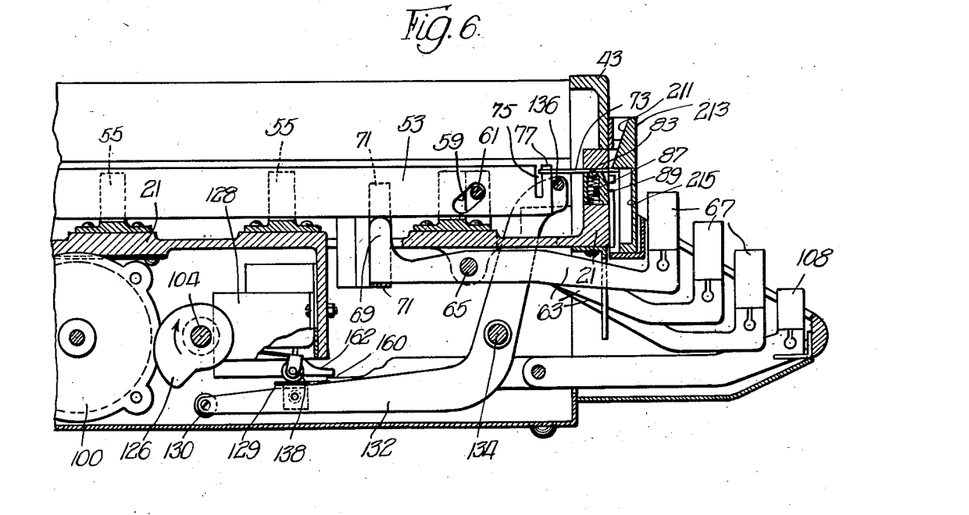
Figure 6 is a view similar to Figure 5, but showing the clearance arm assembly and its associated parts.

The apparatus includes a plurality of selector bars 53. These bars are held in spaced parallel relation in slots in selector bar guides 55, best shown in Figure 6. These guides 55, as shown, are secured to upper portions of the main casting 21. Each selector bar is located, as best shown in Figure 3, so that it is immediately below a notch 39 between teeth 41 in the lower metal members 23 of the cards 25. As best shown in Figure 6, each selector bar 53 is provided with diagonal slots 59 through which pass the selector bar pins 61. A key 63 is provided for each selector bar 53, these keys being pivoted on the pivot bar 65. These keys are provided in three rows for convenience and compactness, the keys correspondingly differing in length. Each key 63 is provided with a finger piece 67 and an upwardly extending bar engaging portion 69, the rounded upper face of which thrusts toward the underface of its associated bar 53. Each key 63 is provided at its contact end with a U-shaped clip 71, the upwardly extending legs of which pass on either side of the associated selector bar so as to assure lifting contact of the key end 69 against the selector bar. It will be apparent that downward pressure on a key 67 thus serves to raise the corresponding selector bar 53.

It will be further apparent that as such bar 53 is raised it takes a forward movement or movement to the right, as seen in Figure 6, due to the inclination of the guide slot 59. Each selector bar 53 has associated therewith a cutter bar 73, this construction being shown in detail in Figure 7. The selector bar 53 has a slot 75 at its forward end which forms a vertically extending finger 77. This finger 77 passes through a slot 79 in the cutter bar 73. Each cutter bar 73 has a small circular opening 81 therein which coacts with the spring-pressed ball detent 83 to retain cutter bar forward and the selector bar 53 in its upper and forward position when it has been raised to this position by its associated key. The detents 83 are pressed upwardly by springs 85 held in place by caps 87 which are threaded into the detent bar 89. It will be understood that this bar 89 is supported in the main frame 21 and extends across the front of the apparatus carrying a detent ball 83 for each selector bar.

Figure 7:
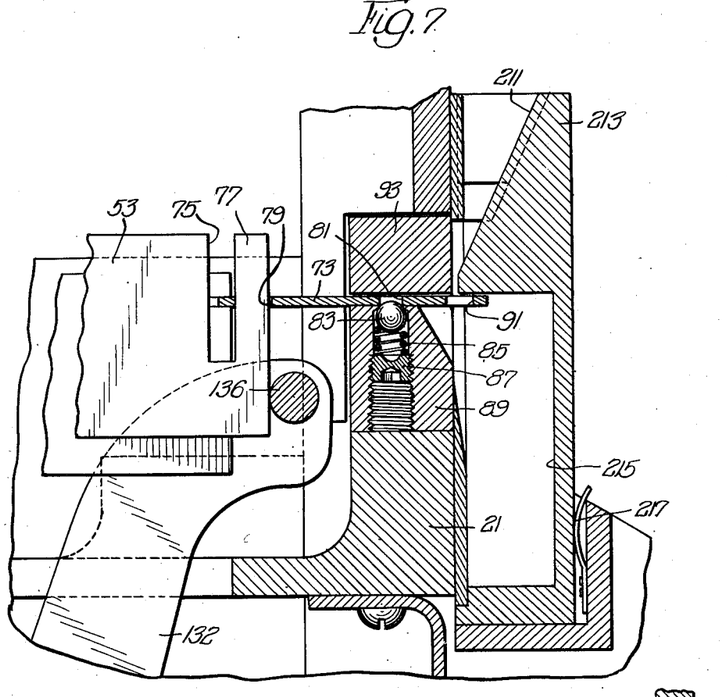
Figure 7 is a fragmentary, longitudinal, vertical section, on an enlarged scale, showing the coding mechanism including the removable card guide and waste receptacle.

Each cutter bar 73 is provided with a cutting slot 91 and the fixed cutter knife 93 is located above the bars 73 so that it coacts with the several cutter bars and the forward edges of the cutting slots 91 to cut off any tooth 41 on the lower edge of a card 25 which may be inserted therein, as will be described hereinafter.

It will be apparent that the several keys are all so balanced that their contact ends 69 will follow up their associated separator bars 53 and the keys and finger pieces 67 will remain depressed after the finger pieces have been released from manual pressure. The selector bars 53 will be held in their upper position, as previously described, by the detent construction.

The functioning of the apparatus, other than the raising of the selector bars by the keys as described, is carried out electrically in a timed sequence. As shown in Figure 2, an electric motor 100 is supported in the lower part of the main frame 21. This motor drives a gear 102 which meshes with a gear 103, this latter gear being secured to a cam shaft 104 and rotating that shaft. As shown at 106, the cam shaft 104 is carried in ball bearings in the side of the main casting 21. This cam shaft 104 carries a plurality of cams which serve to actuate switches in the sequential operation of the cycle of the machine.

In addition to the keys 63 which lift the selector bars 53, there is provided an elongated operate key or bar 108. Depressing this bar swings the operate arm 109 about its pivot shaft 110 to raise the operate member 111 to close the operate switch 112 which controls the circuit to motor 100. The opposite end of the operate bar 108 is connected to the shaft 110 by the short arm 113.

As the shaft 104 is rotated by the motor 100, the various cams operate other switches. Cam 114 operates the motor switch 116. Cam 118 operates the magnet switch 120. In addition to these switch operating cams used in normal operation, a code cam 122 operates the code switch 124 which is a single pole double-throw switch. In addition to the switch operating cams, the shaft 104 carries adjacent its opposite ends a duplicate pair of key return cams 126. In addition to the other switches which have been described, the switch 128 is shown adjacent the cam shaft 104, but is not operated by a cam. This switch 128 is operated by bracket 129 carried by the clearance arm 132.

Referring next to Figure 6, one of the clearance cams 126 is shown on shaft 104 adjacent to the roller 130 which is carried by the rear end of one of the spaced clearance arms 132. These arms 132 are pivoted on a cross shaft 134 and are joined at their upper ends by a clearance bar 136. As shown in Figure 6, this bar 136 rests against the front of the fingers 77 of the selector bars 53. This clearance assembly including rollers 130, arms 132 and bar 136 is so balanced that the bar 136 is held against the front face of fingers 77 by gravity. This assembly carries the bracket 129 which, as shown in Figures 2 and 6, engages the actuating wheel 138 of the switch 128 which has been called the non-operate switch. This switch is normally open and is in the motor circuit so that the motor cannot operate with the parts in the position shown in Figure 6 at which time none of the selector bars 53 has been raised. Raising even a single bar 53 will force the cross bar 136 forwardly and downwardly thus lifting the rear portion of the clearance assembly and the bracket 129 to close switch 128 so that the apparatus may be operated.

Figure 11:
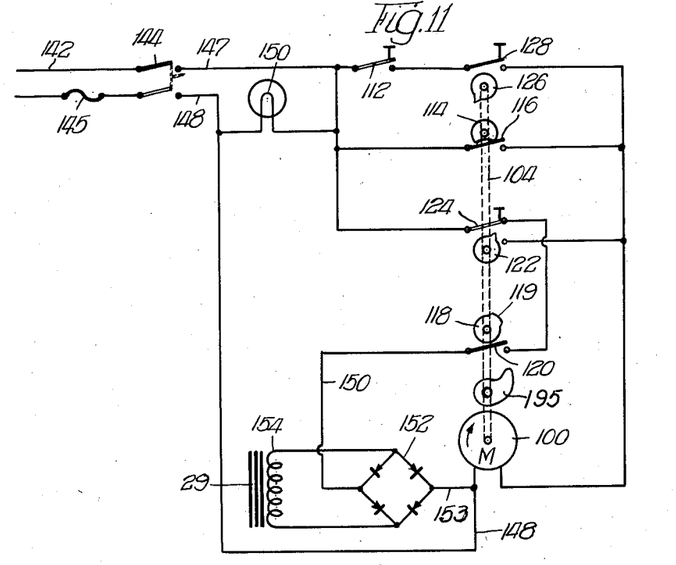
Figure 11 is a diagram of the operating and control circuits.

The circuits of the several switches are shown in Figure 11. The main power line 142 leads through switch 144 to the apparatus, one side of the power line 142 being shown as provided with a fuse 145. The power line leads to wires 147 and 148. The signal light 150 is shown as shunted across wires 147 and 148. This light 150 may be a small neon bulb which, when illuminated, will indicate that the power is turned on in the apparatus. The operate switch 112 is the switch which is closed by depressing the operate bar 108 and is not controlled by cams on the cam shaft 104. The non-operate switch 128 is connected in series with the operate switch 112 and is normally open as previously described. This switch 128 is not closed by the clearance cam 126, but is opened by that cam. Switch 128, as previously described, is closed by the action on the clearance assembly of the forward and upward movement of any of the selector bars 53. Thus the motor circuit cannot be closed by the operate bar 108 until at least one selector bar 53 is raised. The motor switch 116 is in parallel with both the operate switch 112 and the non-operate switch 128. This switch is normally open. It is closed by the motor cam 114 early in the cycle of rotation of the cam shaft 104 so that the motor will continue to operate and the cam shaft continue to rotate after pressure on the operating bar 108 closing switch 112 has been released.

The code cam 122 operates the single pole double-throw code switch 124 in one direction to include the switch 120 and rectifier 152 in the circuit. The magnet cam 118 is shown as provided with a high point 119 so that it operates the magnet switch 120 in each rotation of the shaft 104. The magnet switch 120 connects the side of the main line which is led into the switch wiring through wire 147, through wire 150 to the bridge rectifier 152. The opposite side of the rectifier 152 is connected by wire 153 to the wire 148 which is connected to the opposite side of the power supply. The rectifier 152 is connected to the coil 154 of the magnet 29.

Figure 10:
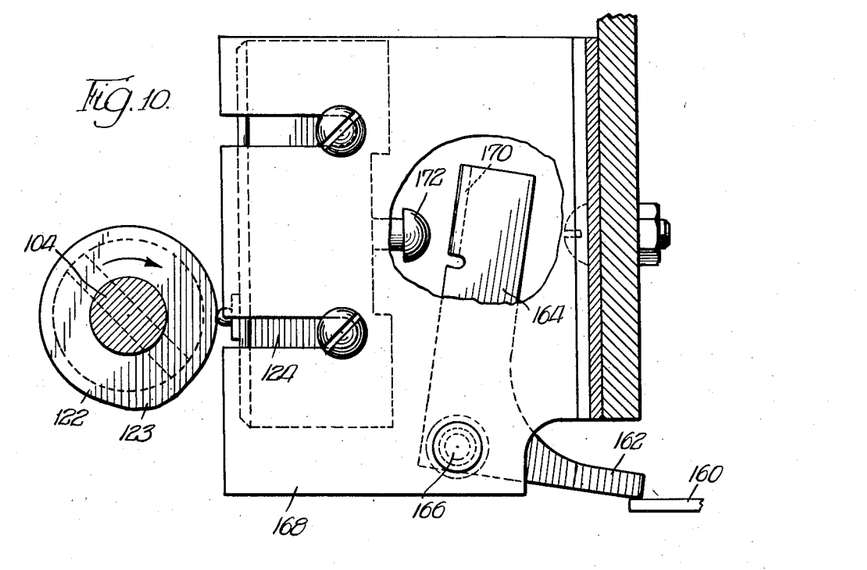
Figure 10 is a view similar to Figure 8, showing the code cam and switch and reset switch control.

As shown in Figures 2 and 10, the code finger piece 156 moves downwardly the outer end of code key 158 thus lifting its inner flattened end 160. This end 160 lifts the arm 162 of the code bell crank 164 which is pivoted at 166 on the bracket 168 supporting the code switch 124. The lateral finger 170 engages the switch button 172 of code switch 124 to move the switch to the opposite position from that in which it is shown in Figure 11, thus cutting the magnet coil out of the circuit.

Figure 8:
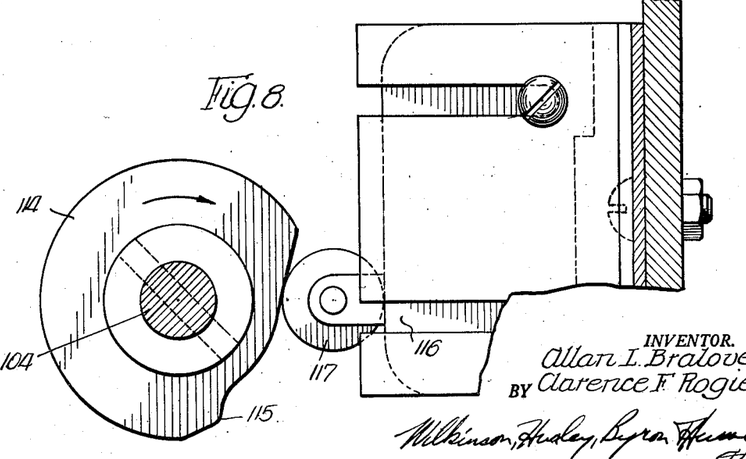
Figure 8 is a fragmentary, longitudinal, vertical section, on an enlarged scale, showing the motor cam and associated switch.

The motor cam 114 and its associated switch 116 are shown in detail in Figure 8. The cam 114 has a rise extending over more than half of its circumference. The function of this cam is to engage roller 117 to close the normally open motor switch 116 and to maintain the switch closed until the cam shaft 104 completes one revolution. The switch 116 is opened automatically when the roller 117 rides off cam 114. This cam and switch therefore avoid the necessity of holding down the operate bar 108 which starts the initial movement of the motor and cam shaft 104 by closing switch 112 manually. This cam also insures that the motor will be stopped at the completion of one rotation and that the parts will thus be in proper position to start a succeeding operation. The motor 100 is de-energized when the roller 117 rides down the cam at 115, but the parts coast due to their momentum until the roller 117 and cam 114 reach the starting position as shown in Figure 8.

Figure 9:
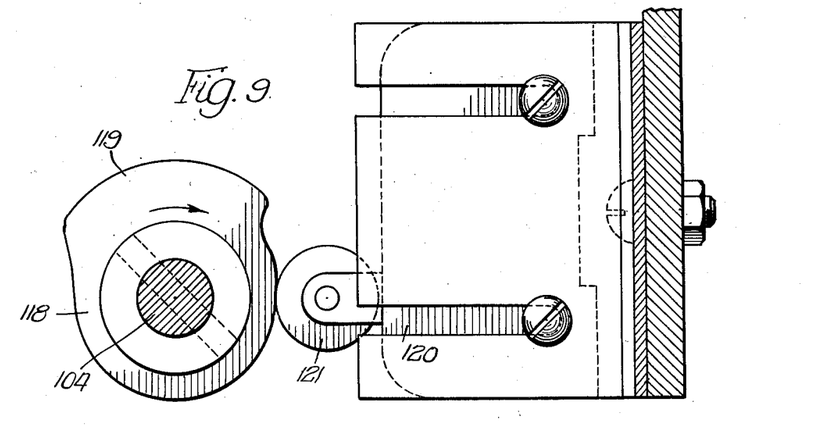
Figure 9 is a view similar to Figure 8, showing the magnet cam and switch.

The magnet control cam 118 and its associated normally open switch 120 are shown in detail in Figure 9. This cam 118 has an arcuate rise 119. The magnet circuit is closed while the roller 121 of switch 120 rides on this rise. This gives a single selecting impulse to the magnet which may have a duration of about three-tenths of a second. The switch 120 is opened automatically when the roller 121 rides off cam 118.

The code cam 122 and the code switch 124 are shown in detail in Figure 10. This switch 124, as has been stated, is a single pole double-throw switch. The switch's location in the circuit is shown clearly in Figure 11. The purpose of this switch is to insure that the magnet is connected back into the circuit and is energized in the next operating cycle after the apparatus is used for coding cards by cutting off unwanted teeth. The cam 122 has a short rise 123 which serves to operate the switch. A short rise is all that is necessary to throw the switch as the switch is held in the position to which the cam 122 moves it until it is moved in the opposite direction by the portion 170 of the bell crank 164 when coding cards, as has been previously described. The rise 123 operates the switch at the end of the coding cycle or after the rise 119 has passed over the magnet switch 120 during the coding cycle.

Figure 5:
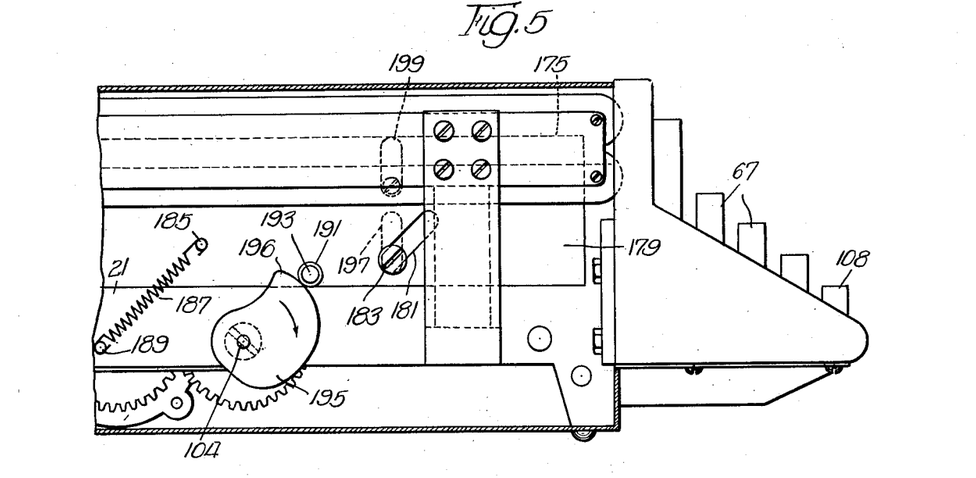
Figure 5 is a vertical, longitudinal section of the forward portion of the machine showing the aligner-lifter bar and its operating mechanism.

The aligner-lifter bar 175 is shown in cross section at the left of Figure 3. This bar is also shown in broken lines in Figure 5. The bar 175 has a thicker, lower portion 177 which fits within the flat U-shaped aligner-lifter bar guide 179. This aligner-lifter bar guide 179 is provided with diagonal slots 181 into which fit guide studs 183. The aligner-lifter bar guide 179 is also provided with a stud 185 to which is secured one end of a hold-down spring 187, the other end of the spring being secured to a fixed stud 189 extending from the main casting 21. The aligner-lifter bar guide 179 is also provided with a lifting roller 191 carried on stud 193. The aligner-lifter cam 195 is fitted on the end of the cam shaft 104 outside of the main casting 21, as shown in Figures 3 and 5. The aligner-lifter bar 175 is provided with vertically extending slots 197 which fit about the guide studs 183. The upper portion of the aligner-lifter bar 175 is also provided with vertical slots 199 through which pass the upper aligner-lifter bar guide studs 201 also secured to the main body casting 21.

It will be apparent that in the operation of the apparatus, when the cam 195 bears against the aligner-lifter roller 191, as shown in Figure 5, the aligner-lifter bar guide 179 will be raised to its uppermost position. This aligner-lifter bar guide 179 in moving upwardly also, under the influence of the diagonal slots 181, moves forwardly of the apparatus or to the right as seen in Figure 5. The aligner-lifter bar 175 itself, however, while it is lifted with the aligner-lifter bar guide 179, is lifted directly vertically since its movement is limited by the vertical guide slots 197 and 199.

The location of the cam 195 on the cam shaft 104 is such that when the parts are at rest, the aligner-lifter bar is in its upper position as shown in that figure. As the operative cycle starts and cam shaft 104 rotates in the clockwise direction, as indicated by the arrow in Figure 5, the cam roller 191 drops off of the high portion 196 of the cam and the aligner-lifter bar guide 179 and aligner-lifter bar 175, due to the spring 187 and gravity, move downwardly to their lower position determined by the upper edges of the slots 181, 197 and 199. This lower position brings the aligner-lifter bar down below the adjacent rail 22 on the top of the main casting 21 and consequently below the lower edge of the metallic members 23 on the bottom edge of the cards 25. With the aligner-lifter bar in this lower position therefore the cards are free to move to the left under the influence of the magnets 29. The relationship of the cams is such that the rise 119 of the magnet cam 118, shown in Figure 9, does not energize the magnet until after the roller 191 has dropped off cam rise 196 and the aligner-lifter bar is in its lower position.

A cycle of operation of the apparatus to select one or more cards begins with the aligner-lifter bar 175 in the raised position, all selector bars 53 in their lowered position and the keyboard cleared, that is, with all keys 63 and finger pieces 67 in their upper or normal position. The operator selects the card or cards which is desired to elevate and remove by depressing the proper keys in accordance with the coding of the cards. This means that keys 67 are depressed to raise selector bars 53 such that only the selected card or cards have no teeth immediately to the right of all of the raised selector bars. Consequently, only the selected card or cards can be moved to the left under the influence of the magnet. Depressing a key or keys raises the selector bars 53 associated with such keys. The selector bar 53, when raised, moves the selector bar clearance cross arm 136 to its forward position. This, in turn, by means of the bracket 129 carried by one of the side arms 132 of the selector bar assembly, closes the switch 128 which, in turn, closes the circuit to the operate switch 112. When no selector bar 53 is raised and the operate switch 112 is closed, the circuit is open by reason of the open switch 128 and the cycle of operation of the apparatus cannot be actuated. It is thus impossible to operate the cycle when some of the cards are not restrained by selector bars 53 and when in consequence all cards would be moved to the left by the magnet.

The operator next pushes the operate bar 108 which initiates the cycle resulting in raising the left ends of the desired cards. Actuation of the operate bar 108 closes the motor circuit through the switch 112 and the motor 100 starts to rotate the cam shaft 104. This switch 112 is only held closed as long as the operate bar 108 is held manually depressed. The cam 114 on the cam shaft 104, however, immediately closes the motor circuit so that it is only necessary to hold the bar 108 down for a small fraction of a second. The further operation of the motor 100 is then controlled by this motor cam 114. The motor cam 114 serves to turn the motor 100 off at the end of the operating cycle at which time all parts are in position for beginning a new operating cycle.

On the cam shaft, the cam 195 regulates the up and down movement of the aligner-lifter bar 175. The aligner-lifter bar 175 is initially in its raised position in which it is shown in Figures 3 and 5. The beginning of the operating cycle causes the cam 195 to rotate so that the roller 191 drops off the cam rise 196 which permits the aligner-lifter bar 175 to be drawn down by spring 187. This bar 175 remains lowered during the actuation of the magnet 29 by the rise 119 on the cam 118. After the magnet 29 has been energized and de-energized the aligned-lifter bar 175 is again brought to its raised position by means of cam 195. As it is raised, it lifts the left end of the desired card or cards 25 which have been pulled to the left by the magnet 29.

This magnet cam 118 is shown as having a relatively long rise 119 to give an energizing impulse to the magnet 29. It has been ascertained that the magnet should be energized for a period of the order of two-tenths of a second in order to insure the selected card responding to the impulse and move it to the left. Since there is ample time in the one second cycle of operation of the apparatus a pulse of about three-tenths of a second is provided.

After the selected card or cards have been drawn to the left by the magnet pulses and lifted by the aligner-lifter bar 175, the cycle continues for the purpose of restoring all parts to the initial position. The pair of cams 126 acting simultaneously with the raising of the aligner-lifter bar 175 push down the rollers 130 carried at the left end of the clearance arm assembly and the forward cross bar 136 of that assembly presses against the front ends of all selector bars 53 which have been raised. This pressure releases the selector bars 53 from a spring-pressed ball detent 83, Figure 7, fitted in opening 81 in the cutter bars 73 connected to the selector bars 53 and the selector bars 53 are returned to their lower position clear of the teeth 41 on the cards. The cams 126 which move the clearance arm assembly and depress the selector bars 53 are so designed that after the clearance arm assembly is fully returned to normal position the cams clear the clearance arm assembly rollers 130 permitting the forward cross bar 136 to move forwardly when the keys 67 are depressed and selector bars 53 raised at the beginning of the next cycle of operation. It is to be noted that the clearing movement of the clearance arm assembly also moves the bracket 129 away from the operate switch 128 and thus opens the operate switch circuit. Thus, the cycle cannot be re-actuated until one or more selector bars 53 is again raised.

After the aligner-lifter bar 175 has come to its full raised position and the keyboard has been cleared by restoring the selector bars 53 to their lower position, the motor cam 114 automatically opens the circuit to the motor 100 and the cycle is complete. It will be apparent that as the selector bars 53 move downward they force down the left ends 69 of their associated keys 63 thus lifting the finger pieces 67 on the keys to the normal position and clearing the keyboard of all depressed keys. The entire time required for a single cycle of operation is one second. It will be apparent from the above discussion of the cycle, that the cycle is carried out automatically once the operating bar 108 has been manually depressed for a very short period.

Figure 4:
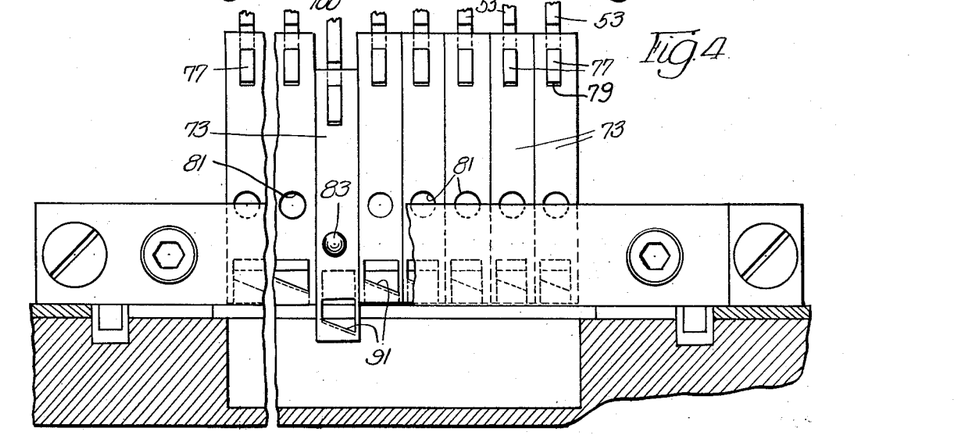
Figure 4 is a fragmentary, horizontal section, on an enlarged scale, showing the coding bars and knife.

The cycle of operation when coding a card 25 by cutting off selected teeth 41 is very similar to that which has been described above. The only difference is that the magnet 27 is not energized during this coding operation. This is accomplished by means of the micro-switch 124 which is a single pole double-throw switch with a reset actuated by the cam on the cam shaft. Operation of the code button 156, by means of code lever 153, pivoted on cross shaft 110 causes the lever end 160 to rise and by means of the bell crank, which is swung counterclockwise about pivot 166, Figure 10, causes contact piece 170 to engage the switch operating button 172 and throws the switch 124 to the disconnect position so that the magnet circuit is disconnected while the motor circuit is simultaneously closed as shown in the diagram Figure 11. The motor 100 is thus actuated to complete a cycle with the magnet 27 disconnected. The micro-switch 124 is reset by the rise 123 on cam 122 at a time late in the cycle after the time when the magnet 27 would normally have been actuated and just before the time when the motor cam 114 and switch 116 are ready to stop the cycle. In this coding operation after the desired keys 67 have been depressed to raise the desired selector bars, the card 25 is inserted into the recess 211 in the top of the member 213, as shown in Figure 7. This recess 211 is so shaped with sloping sides and with a sloping front that the teeth 41 are directed downwardly into the cutting openings 91 in such cutter knives 73 as have been moved forward by raising their associated selector bars 53. Figure 4 shows this construction and should be considered in connection with Figure 7. The cutter knives 73 associated with selector bars which have not been raised are clear of the opening 211 in member 213 through which the teeth 41 pass, and are covered by the cutter bar 93.

After the card 25 has been inserted, the code key 156 is depressed and the cycle of operation proceeds as described. When the raised selector bar or bars 53 are moved to the left, as seen in Figure 7, by means of the finger 77 on the raised selector bars, the front cutting edge of the coding opening 91 in the knife forces the selected tooth against the cutter bar 93 and shears the tooth 41 from the card. After the completion of the cycle, the card 25 is lifted out of the recess 211 in member 213. The cavity 215 in the member 213 receives teeth 41 removed by the cutting operation. The receptacle member 213 is held in position by the springs 217, as clearly shown in Figure 7, and may be readily lifted from the apparatus by grasping its lateral ends and the cut off teeth may be dumped from the receptacle cavity 215 by inverting the member 213. The member 213 may be reinserted in the apparatus by a simple downward pressure against the springs 217.

The card trays shown and the apparatus may be made in various sizes, but a convenient size has been found to be a tray holding 1,000 cards. These cards are separated into groups of 100 cards by means of the separators 37. The cards are located accurately on the tray by means of the semi-circular cutout portions 31 of the metallic strip 27. By this means the cards are locked onto the card tray against lateral movement and can move only in a vertical direction. When inserting a tray into the apparatus, the guide slots 49 and 51, at the front and back of the apparatus, guide the tray and its cards accurately into the machine. It is to be noted that the guides 49 and 51 are shaped as three-sided funnels with the open side facing inwardly toward the chamber in the apparatus to receive the cards. These guide ways serve to align the tray by means of the ends of side rails 33 so that the tray is in accurate alignment before the lower edges of the metal members 23 of the cards 25 come to rest on the rails 33 of the main casting, as shown in Figure 3. The tray rails 33 at this time come to rest on shoulders 24 of the main frame 21 so that they are entirely clear of the arcuate recesses 31 in the cards. This registration of the tray also occurs high enough in the apparatus so that the cards are guided clear of the raised aligner-lifter bar 175.

With the tray in position, the wire separators 37 still act to support and separate the cards while maintaining them vertical.

The cards, once placed, are restrained against movement to the right by the inner downwardly extending portion 48 of the right-hand housing member 47. They are restrained from moving to the left by the raised aligner-lifter bar 175. The cards are thus accurately aligned and located without the necessity for manual alignment or for mechanical alignment of any kind other than the insertion of the tray of cards into the machine. The parts are so formed that only small clearances are necessary to be provided between the aligner-lifter bar 175 and the cards. A similar small clearance is provided between the right side of the cards in the housing portion 48. The total amount of play provided is less than the entrance width between the teeth 41 and, as shown, the teeth are beveled to take care of this small amount of play and insure the selector bars rising between teeth.

The cards are thus accurately aligned by the tray and when inserted in the machine this alignment is maintained after the cards rest on the rails 33 clear of the tray by the small clearances between the cards and the housing 48 and aligner-lifter bar 175. Thus, trays may be inserted and removed rapidly and easily from the machine so that a single machine may take care of a substantial number of trays. It is to be noted also that at the time when the aligner-lifter bar 175 is lowered during the cycle of operation, all cards other than those to be drawn to the left are held in position by selector bars so that alignment is maintained. The only manual alignment necessary at any time is when reinserting cards which have been selected and removed for use.

While certain preferred embodiments of the invention have been shown, these are to be understood to be illustrative only as it is capable of variation and change to meet differing conditions and requirements. Such modifications are therefore contemplated as come within the spirit and scope of the appended claims.

We claim:

1. A card selector apparatus for use with cards, said cards having magnetic means adjacent their lower edges and having a row of removable selector teeth extending downwardly from their lower edges, said apparatus comprising a housing, a removable frame in the housing, rails carried by the frame for supporting cards on the frame, rails in the housing closely adjacent the frame rails for supporting cards above the frame rails when the frame and cards are inserted in the frame, vertically movable selector bars normally below the card teeth, said bars being supported in the housing, means for selectively raising said bars to positions between said card teeth, an electromagnet in the housing adjacent one edge of the cards, means for energizing said electromagnet, said electromagnet serving, when energized, to act upon the card magnetic means to move cards laterally toward the magnet, fixed guide means adjacent the housing rail opposite the magnet, an aligner lifter bar located at said one edge of the cards between said electromagnet and the cards and arranged to hold the other edge of the cards against the fixed guide means, said bar being movable downwardly to permit movement of selected cards toward said magnet and movable upwardly to lift the selected cards.

2. A card selector apparatus for use with cards, said cards having magnetic means adjacent their lower edges and having a row of removable selector teeth extending downwardly from their lower edges, said apparatus comprising a housing, a removable frame in the housing, rails carried by the frame for supporting cards on the frame, rails in the housing closely adjacent the frame rails for supporting cards above the frame rails when the frame and cards are inserted in the frame, vertically movable selector bars normally below the card teeth, said bars being supported in the housing, means for selectively raising said bars to positions between said card teeth, an electromagnet in the housing adjacent one edge of the cards, means for energizing said electromagnet, said electromagnet serving, when energized, to act upon the card magnetic means to move cards laterally toward the magnet, fixed guide means adjacent the housing rail opposite the magnet, an aligner lifter bar located at said one edge of the cards between said electromagnet and the cards and arranged to hold the other edge of the cards against the fixed guide means, said bar being movable downwardly below the frame rails to permit movement of selected cards toward said magnet and movable upwardly to lift the selected cards and power means for raising and lowering said aligner lifter bar.

3. A card selector apparatus for use with cards, said cards having magnetic means adjacent their lower edges and having a row of removable selector teeth extending downwardly from their lower edges, said apparatus comprising a housing, a removable frame in the housing, rails carried by the frame for supporting cards on the frame, rails in the housing closely adjacent the frame rails for supporting cards above the frame rails when the frame and cards are inserted in the frame, vertically movable selector bars normally below the card teeth, said bars being supported in the housing, means for selectively raising said bars to positions between said card teeth, an electromagnet in the housing adjacent one edge of the cards, means for energizing said electromagnet, said electromagnet serving, when energized, to act upon the card magnetic means to move cards laterally toward the magnet, fixed guide means adjacent the housing rail opposite the magnet, an aligner lifter bar located at said one edge of the cards between said electromagnet and the cards and arranged to hold the other edge of the cards against the fixed guide means, said bar being movable downwardly to permit movement of selected cards toward said magnet and movable upwardly to lift the selected cards, the apparatus being further provided with power driven cams and switches operated by the cams to control an operating cycle in which the magnet is energized with the aligner lifter bar in its lower position, the magnet then de-energized and thereafter the bar raised to lift cards drawn above the bar by the magnet.

4. The apparatus as specified in claim 3 in which additional switching means are provided associated with the vertically movable selector bars to prevent energization of the magnet except when a selector bar is in its upper position.

5. The apparatus as specified in claim 3 in which the power means for driving the cams is an electric motor, a cam shaft driven by the motor, cams on said shaft, certain of said cams raising the aligner lifter bar and releasing it for downward movement, other of said cams operating a switch to energize and de-energize the magnet, and other of said cams operating means for lowering raised selector bars.

6. The apparatus as specified in claim 3 in which the cams are so formed and secured to a cam shaft as to operate the apparatus in a cycle in which the normally raised aligner-lifter bar is first lowered, the magnet is next energized and de-energized, then the aligner-lifter bar is raised and any raised selector bar is lowered, and in which circuit control means are provided for the motor circuit by means of which the motor, when started, will automatically complete said cycle of operation and stop.

7. The apparatus as specified in claim 3 in which the cams are so formed and secured to a cam shaft as to operate the apparatus in a cycle in which the normally raised aligner-lifter bar is first lowered, the magnet is next energized and de-energized, then the aligner-lifter bar is raised and any raised selector bar is lowered, and in which circuit control means are provided for the motor circuit including a manual, normally open switch, a switch cam on the cam shaft, a cam operated switch, the cam and cam operated switch being so related that, when the motor circuit is closed momentarily by the manual switch, the cam operated switch maintains the motor circuit closed through a complete cycle of operation.

References Cited in the file of this patent

UNITED STATES PATENTS

| | | |
|---|---|---|
| 1,778,155 | Hildreth | Oct. 14, 1930 |
| 2,002,807 | Whitson | May 28, 1935 |
| 2,062,155 | Welk et al. | Nov. 24, 1936 |
| 2,379,943 | Whitson | July 10, 1945 |
| 2,495,491 | Whitson | Jan. 24, 1950 |
| 2,644,459 | Schlommer | July 7, 1953 |